(12) United States Patent
Mohri et al.

(10) Patent No.: US 8,631,107 B2
(45) Date of Patent: Jan. 14, 2014

(54) COMMUNICATION SYSTEM, COMMUNICATION CONTROL METHOD, COMMUNICATION CONTROL APPARATUS

(75) Inventors: Takao Mohri, Kawasaki (JP); Yuji Wada, Kawasaki (JP); Shigeki Fukuta, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 226 days.

(21) Appl. No.: 12/000,459

(22) Filed: Dec. 12, 2007

(65) Prior Publication Data
US 2008/0147842 A1 Jun. 19, 2008

(30) Foreign Application Priority Data
Dec. 14, 2006 (JP) .................. 2006-337323

(51) Int. Cl.
*G06F 15/173* (2006.01)
*H04W 4/00* (2009.01)
*H04L 12/66* (2006.01)

(52) U.S. Cl.
USPC ............................ 709/223; 370/328; 370/352

(58) Field of Classification Search
USPC ................................ 709/223–226
See application file for complete search history.

(56) References Cited

U.S. PATENT DOCUMENTS

| 6,549,773 | B1* | 4/2003 | Linden et al. | 455/426.1 |
| 2002/0083322 | A1* | 6/2002 | Lagosanto et al. | 713/172 |
| 2006/0190580 | A1* | 8/2006 | Shu et al. | 709/223 |
| 2006/0280165 | A1* | 12/2006 | Blumenschein et al. | 370/352 |
| 2007/0293275 | A1* | 12/2007 | Kalinichenko et al. | 455/567 |

FOREIGN PATENT DOCUMENTS

| JP | 2003-346041 | 12/2003 |
| JP | 2004-86490 | 3/2004 |

* cited by examiner

*Primary Examiner* — Evans Desrosiers
(74) *Attorney, Agent, or Firm* — Staas & Halsey LLP

(57) ABSTRACT

According to an aspect of an embodiment, a communication system comprising: a plurality of service providing devices for providing first service information for identifying service by a first communication protocol; a gateway apparatus for converting from said first service information to second service information, and for sending second service information to said service using devices; and a plurality of service using devices for storing said second service information received from said gateway apparatus and sending a request for executing service in said service providing device to said gateway apparatus in accordance with an user input.

9 Claims, 14 Drawing Sheets

```xml
<?xml version="1.0" encoding="utf-8"?>
<root xmlns="urn:schemas-upnp-org:device-1-0" xmlns:dlna="urn:schemas-dlna-org:device-1-0">
    <specVersion>
        <major>1</major>
        <minor>0</minor>
    </specVersion>
    <device>
        <dlna:X_DLNADOC>DMS-1.00</dlna:X_DLNADOC>
        <deviceType>urn:schemas-upnp-org:device:MediaServer:1</deviceType>
        <friendlyName>PC Media Server</friendlyName>
        <manufacturer>DigiOn, Inc.</manufacturer>
        <manufacturerURL>http://www.digion.com/</manufacturerURL>
        <modelName>DiXiM Media Server</modelName>
        <modelURL>http://www.digion.com/dixim/</modelURL>
        <UDN>uuid0000000000000000-1010-8000-0013a9-13904e</UDN>          (a)
        <originalUDN>uuid:2e958c0b-c8f4-24bb-35f9-431154729529</originalUDN>   (b)
        <presentationURL>http://192.168.1.123:4567/deviceABC/</presentationURL>   (c)
    </device>
</root>
```

Fig.5

| SERVICE ID | ORIGINAL SERVICE ID | PRESENTATION URL |
|---|---|---|
| uuid00000000000000-1010-8000-0013a9-13904e | uuid:2e958c0b-c8f4-24bb-35f9-431154729529 | http://192.168.1.123:4567/deviceABC/ |
| uuid00000000000000-1010-8000-0013a9-13904f | uuid:3e467d2a-d2e5-54ww-78h9-6053218890047 | http://192.168.1.123:4568/deviceDEF/ |
| uuid00000000000000-1010-8000-0013a9-13904g | uuid:4e489y5p-g9k7-65se-85j9-5784123369582 | http://192.168.1.123:4569/deviceGHI/ |
| ... | | ... |
| ... | | ... |
| ... | | ... |

COMMUNICATION SYSTEM, COMMUNICATION CONTROL METHOD, COMMUNICATION CONTROL APPARATUS

BACKGROUND

1. Field of the Invention

The present invention relates to a service providing system through which a service providing unit provides services to user terminals via a network.

2. Description of the Related Art

Circumstances of connecting to such network are now widespread among ordinary homes, companies and the like. Information devices for actively using such network are also widespread. The information device is a device that can be connected to such network. The information device may be, for example, a personal computer, peripheral devices of the personal computer, AV (Audio Visual) devices, home appliances and the like.

There have been technologies for enabling users to integrally use the services provided by the various information devices.

The following documents disclose the prior art technologies.

Japanese Patent Laid-open No. 2004-86490
Japanese Patent Laid-open No. 2003-346041

SUMMARY

According to an aspect of an embodiment, a communication system comprising: a plurality of service providing devices for providing first service information for identifying service by a first communication protocol; a gateway apparatus for converting from said first service information to second service information, and for sending second service information to said service using devices; and a plurality of service using devices for storing said second service information received from said gateway apparatus and sending a request for executing service in said service providing device to said gateway apparatus in accordance with an user input.

BRIEF DESCRIPTION OF THE DRAWINGS

FIG. 5 shows one exemplary conversion service information announced by a service advertising section of a gateway unit;

FIG. 6 shows one example of a discovered service storing section;

DESCRIPTION OF THE PREFERRED EMBODIMENTS

Figure 1:
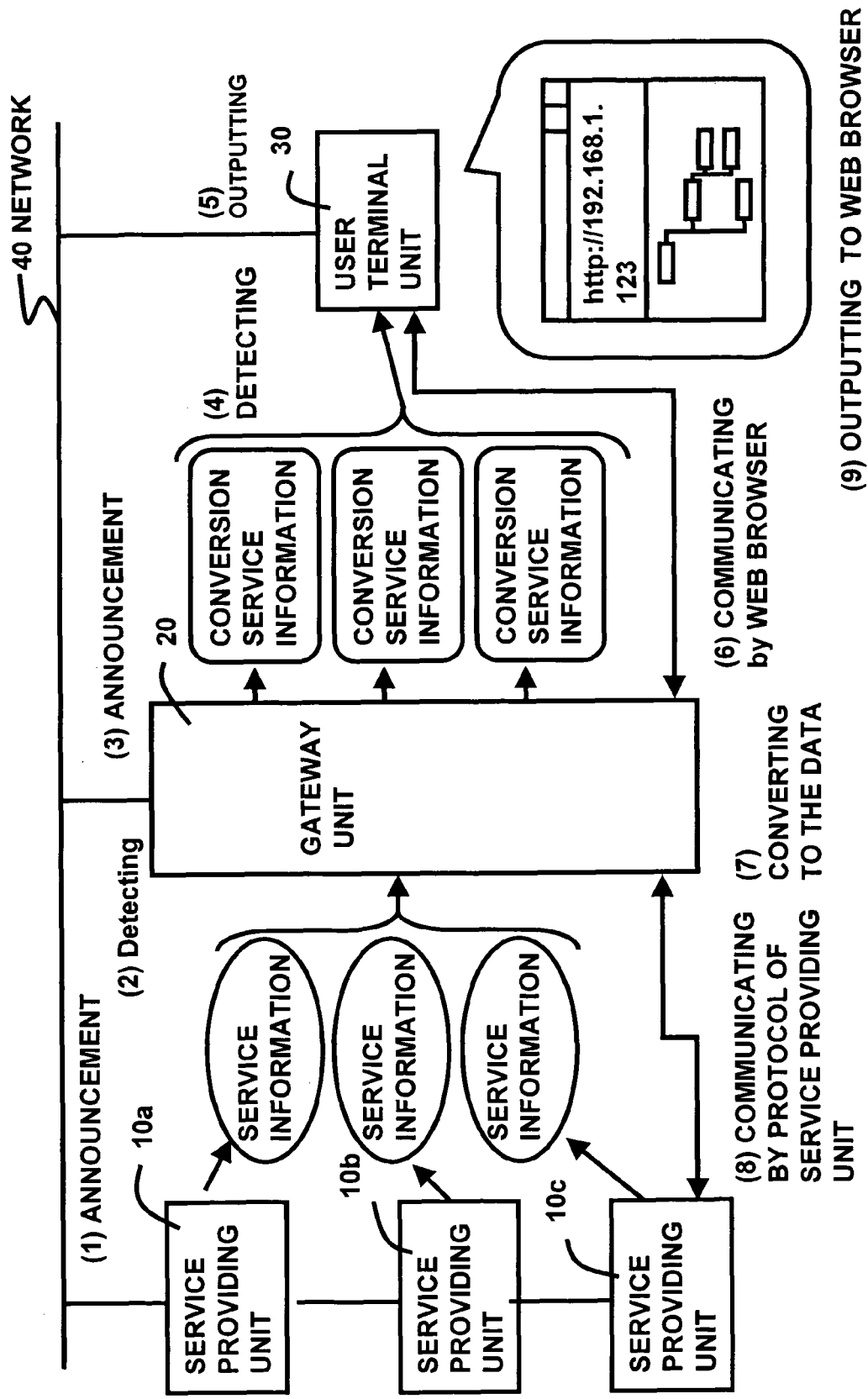
FIG. 1 is a diagram explaining a concept of a service providing system of a present embodiment.

Preferred embodiments of the invention will be explained below with reference to the drawings.

Definitions will be made at first as follows. Provision of a predetermined information processing function by each information device via a network corresponding to a request from a user will be defined as a "service". The person who uses the service will be defined as a "user". The information device that provides the service through the network will be defined as a "service providing unit". A terminal unit used by the user in using the service will be defined as a "user terminal unit". Information for communicating own address of the information device and the service that can be provided by the information device to other information devices (including the user terminal unit) will be defined as "service information". A process for broadcasting the service information periodically via the network by the information device will be defined as "announcing".

The service providing system of the present embodiment uses Universal Plug and Play (UPnP). UPnP is a standard composed of a technology for automatically allocating addresses of information devices connected to the network and a technology for detecting the information devices connected to the network and services provided by the various information devices by using a protocol called Simple Service Discovery Protocol (SSDP). The information devices corresponding to the SSDP announce during when they are connected to the network. Detecting the announced service information, the other information devices connected to the network can perform setup works for using the service provided by the very information device.

The following explanation will be made centering on a case when the present invention is applied to a gateway unit for controlling data communication performed between the service providing unit and the user terminal unit in the service providing system. However, the invention will not be limited to this embodiment. There is also another network technology of DLNA (Digital Living Network Alliance) for example. DLNA is a standard related to interface of digital household appliances and home networking composed of a device detecting function using the UPnP, a data transferring function using the HTTP and others.

However, in order to use the service, the user has been required to install a dedicated client program to the terminal unit in advance. The client program is a program having functions of discovering the service information announced on the network, of controlling an access to the information device, of presenting a control screen for using the service and the like.

There is also a case when a communication protocol used in exchanging data between the information device and the client program differs per each information device. Therefore, the client program must be installed per type of the service.

As a result, there has been a problem that a burden of operational costs required in using the service such as costs required in introducing, installing and updating the client program becomes heavy.

A concept of the service providing system of the present embodiment will be explained at first.

FIG. 1 is a diagram explaining the concept of the service providing system of the present embodiment. The service providing system is a system for providing various services to the user via the network. The service providing system is composed of the service providing units (service providing devices) 10a, 10b and 10c as well as a gateway unit (gateway apparatus) 20 and a user terminal unit (service using device) 30 connected via the network 40 as shown in FIG. 1.

The service providing units 10a, 10b and 10c are information devices such as AV devices and household appliances. The service providing units 10a, 10b and 10c provide predetermined services corresponding to requests from the users.

The user terminal unit 30 is a terminal such as a personal computer and a PDA (Personal Digital Assistance) used by the user in using the service. The user terminal unit 30 includes a general Web browser conforming to the HTTP (HyperText Transfer Protocol).

The gateway unit 20 is a unit for controlling data communication carried out between each service providing unit and the user terminal unit 30. The gateway unit 20 has converter and transmitter.

The service providing system of the present embodiment aims at enabling the user to use the various services without using the dedicated client program provided per service. Specifically, the service providing system enables the user to use the various services by using the general Web browser provided in the user terminal unit 30 instead of such client program.

The gateway unit 20 of the service providing system of the present embodiment converts the data exchanged between the service providing unit and the user terminal unit when the user uses the service bilaterally into formats that can be processed by the respective units corresponding to the type of the service. The conversion process executed by the gateway unit 20 will be defined as a "conversion service."

Specifically, the gateway unit 20 converts the data transmitted to the user terminal unit 30 into a format conforming to the HTTP that can be processed by the Web browser. The gateway unit 20 also converts the data transmitted to each service providing unit into a format conforming to a communication protocol used in each service providing unit.

Thereby, the user can use the service provided by each service providing unit by using the general Web browser provided in the user terminal unit 30.

Next, a flow of processes carried out until when the user uses the service in the service providing system of the present embodiment will be explained. It is noted that the explanation will be made on a case of using the service provided by the service providing unit 10c among the services provided by the service providing units 10a, 10b and 10c.

At first, the service providing units 10a, 10b and 10c make announcements, respectively (see Step 1 in FIG. 1). The announcement is carried out during when the unit is connected to the network 40. An object to be announced is service information. The service information contains information for using the service that can be provided by the service providing unit 10a, 10b or 10c. The announcement is made via the network 40. Targets of the announcement are the user terminal unit 30 and other service providing units. The announcement is made periodically for example.

The gateway unit 20 always monitors the network 40. Detecting the service information announced by either one of the service providing units (see Step 2 in FIG. 1), the gateway unit 20 selects a conversion service for converting the service represented by the detected service information among a plurality of conversion services prepared in advance per service.

Then, the gateway unit 20 generates service information containing URL (Uniform Resource Locator) for using the selected conversion service. The service information containing URL for using the selected conversion service will be defined as "conversion service information" hereinafter. The gateway unit 20 announces the "conversion service information" on the network 40 (see Step 3 in FIG. 1).

The user terminal unit 30 also monitors the network 40 in the same manner with the gateway unit 20. The user terminal unit 30 detects the service information announced by either one of the service providing units or the conversion service information announced by the gateway unit 20. The user terminal unit 30 stores the detected service information or conversion service information as it detects them (see Step 4 in the figure). When the user terminal unit 30 detects the service information and the conversion service information, respectively, corresponding to the same service, it stores only the conversion service information.

When the user requests a directory of services available at this point of time, the user terminal unit 30 generates a directory of services discovered at this point of time (hereinafter called as a "service directory") on the basis of the stored service information and conversion service information. Then, the user terminal unit 30 presents (outputs) the service directory on the Web browser (see Step 5 in the figure).

Suppose here that the user terminal unit 30 presents the services provided by the service providing units 10a, 10b and 10c on the service directory. Suppose also that the user terminal unit 30 have stored the conversion service information corresponding to the respective services in advance and that the user designates the service provided by the service providing unit 10c.

In this case, the user terminal unit 30 refers to the conversion service information corresponding to the service provided by the service providing unit 10c. The user terminal unit 30 obtains URL for using the conversion service. Then, the user terminal unit 30 designates the obtained URL on the Web browser to access to the gateway unit 20. Thereby, a request for using the conversion service for converting the service provided by the service providing unit 10c is transmitted to the gateway unit 20.

The gateway unit 20 receives the request for using the conversion service. After authenticating the user who has transmitted the request, the gateway unit 20 transmits a request for using the service to the service providing unit 10c. Then, the gateway unit 20 provides the conversion service for converting the service provided by the service providing unit 10c to the user on and after that. Specifically, the gateway unit 20 converts the data transmitted from the service providing unit 10c to the user terminal unit 30 into a format conforming to the HTTP. The gateway unit 20 also converts data transmitted from the user terminal unit 30 to the service providing unit 10c into a format conforming to the communication protocol used in the service providing unit 10c (see Steps 6, 7 and 8 in the figure).

When the user uses the service provided by the service providing unit 10c, the gateway unit 20 converts information exchanged between the user terminal unit 30 and the service providing unit 10c into the formats that can be processed by the respective units. As a result, the user terminal unit 30 is not required to use the dedicated client program. Meanwhile, the user can use the various services by using the general Web browser (see Step 9 in the figure).

It is noted that although the three service providing units and one user terminal unit have been shown in the present embodiment for the convenience of explanation, the service providing system of the present embodiment may be composed of an arbitrary number of service providing units and an arbitrary number of user terminal units.

Next, the configuration of the service providing system of the present embodiment will be explained in detail.

Figure 2:
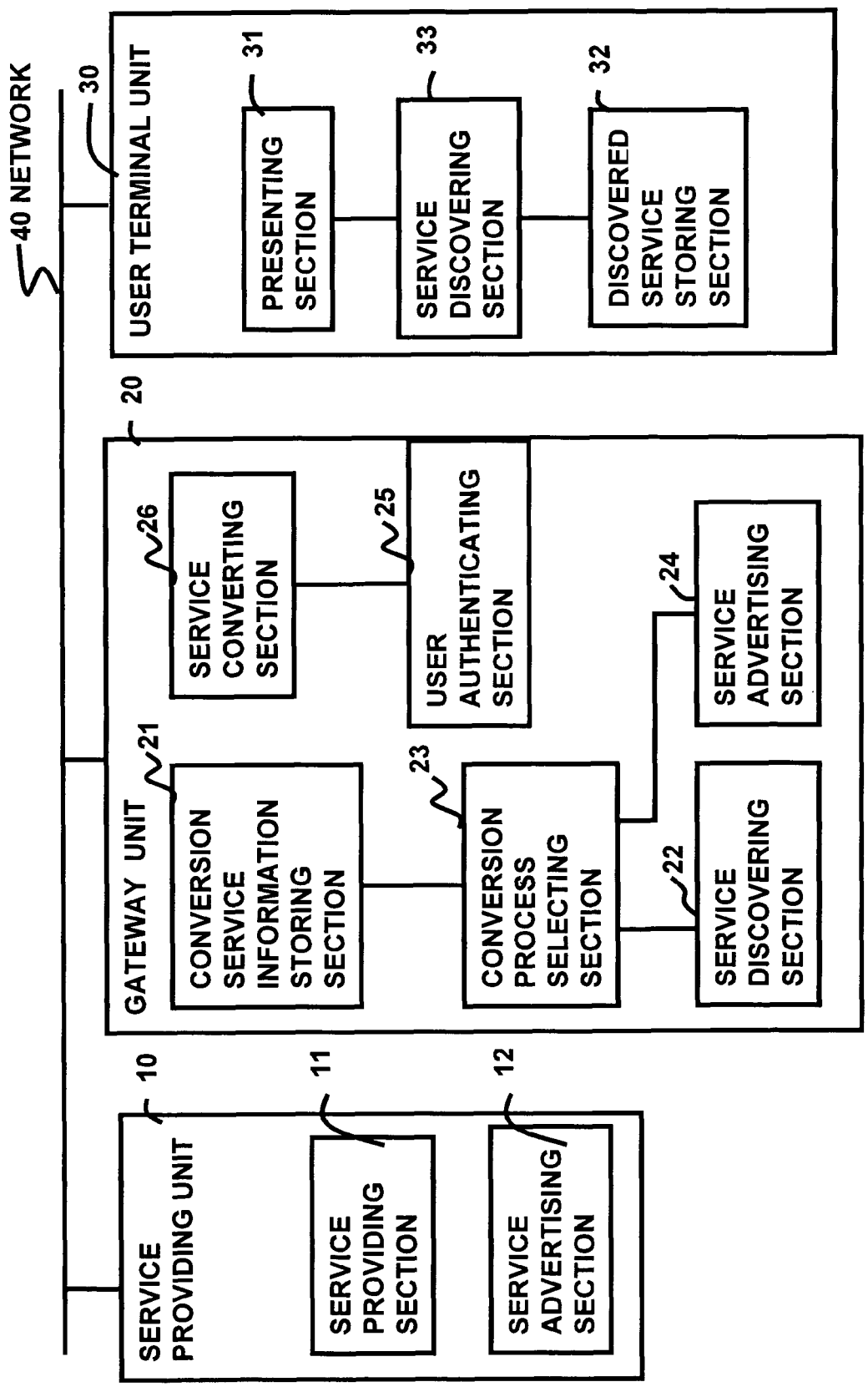
FIG. 2 is a functional block diagram showing a configuration of the service providing system of the embodiment.

FIG. 2 is a functional block diagram showing the configuration of the service providing system of the embodiment. The service providing system in FIG. 2 is composed of the service providing unit 10, the user terminal unit 30 and the gateway unit 20 connected via the network 40. Here, the service providing unit 10 corresponds to the service providing unit 10a, 10b or 10c shown in FIG. 1. A configuration of each unit will be explained below.

The configuration of the service providing unit 10 will be explained at first. The service providing unit 10 is a unit for providing a predetermined service corresponding to a request from users. The service providing unit 10 includes a service providing section 11 and a service advertising section 12.

The service providing section 11 executes processes for providing the predetermined service by performing predetermined information processing corresponding to the request from the user. When the service providing unit 10 is a hard disk recorder for example, the service providing section 11 records video into the hard disk or replays video recorded in the hard disk corresponding to the request of the user.

The service advertising section 12 executes processes for generating the service information for using the service provided by the service providing section 11. The service advertising section 12 also periodically announces the generated service information on the network 40 during when the service providing unit 10 is connected to the network 40. Specifically, the service advertising section 12 generates and announces the service information containing ID for uniquely identifying the service providing unit (called as "service ID" hereinafter), reference information for the service providing section 11 and the like.

Figure 3:
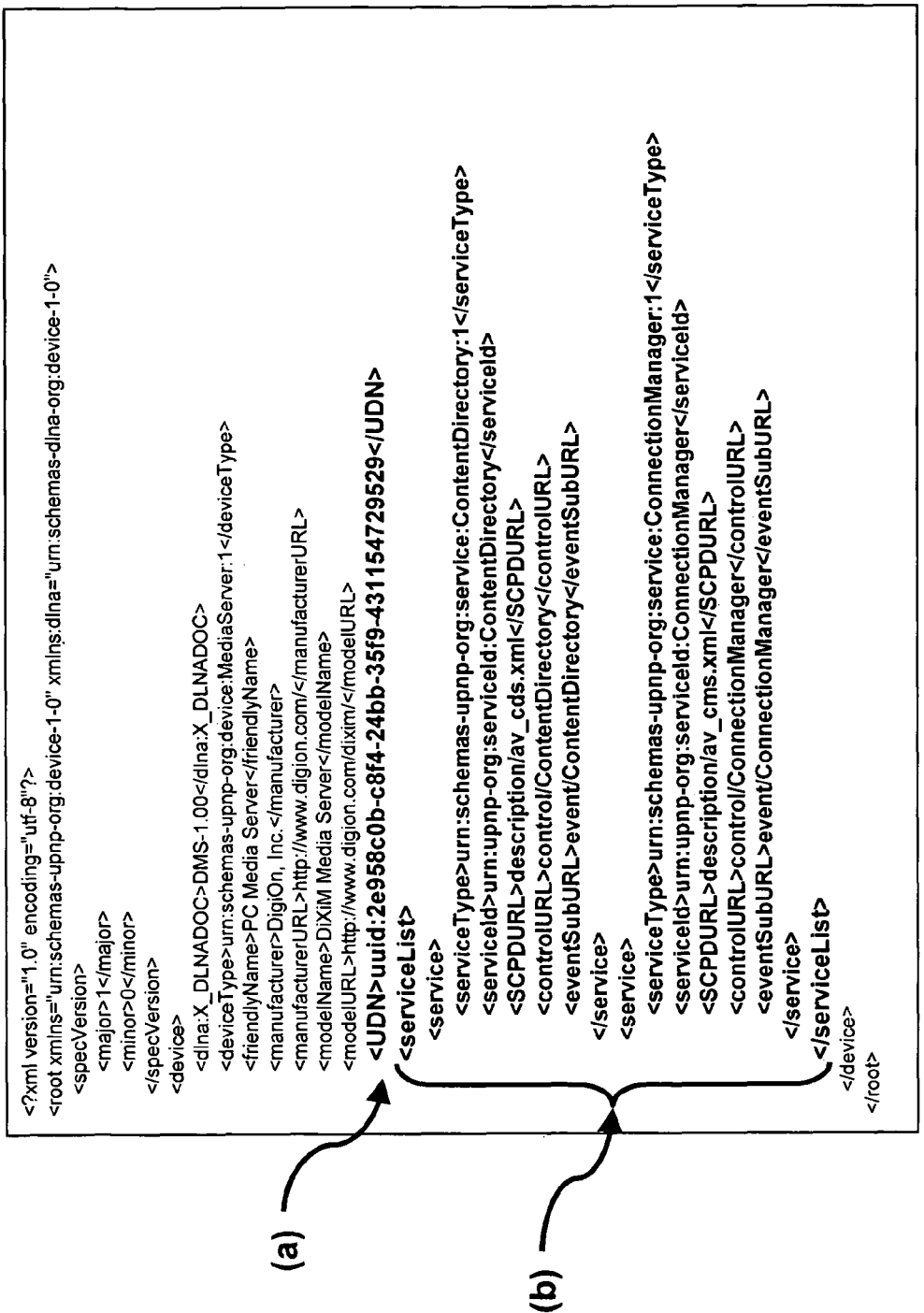
FIG. 3 shows one exemplary service information announced by a service advertising section of a service providing unit.

FIG. 3 shows one exemplary service information announced by the service advertising section 12 of the service providing unit 10. This service information is an example conforming to the UPnP. The service ID is set between a <UDN (Unique Device Name)> tag and a </UDN> tag as indicated by (a) in FIG. 3. The reference information for the service providing section 11 is set between a <serviceList> tag and a </serviceList> tag as indicated by (b) in FIG. 3.

The service advertising section 12 announces the service information and the gateway unit 20 and the user terminal unit 30 detect the service information. As a result, the gateway unit 20 and the user terminal unit 30 can set up to use the service provided by the service providing unit 10 on the basis of the respectively detected service information.

Returning to FIG. 2, the configuration of the gateway unit 20 will now be explained. The gateway unit 20 detects services that are available on the network 40. The gateway unit 20 also relays data exchanged between the service providing unit 10 and the user terminal unit 30 when the user uses the service. The gateway unit 20 has a conversion service information storing section 21, a service discovering section 22, a conversion process selecting section 23, a service converting section 26, a service advertising section 24 and a user authenticating section 25.

Figure 4:
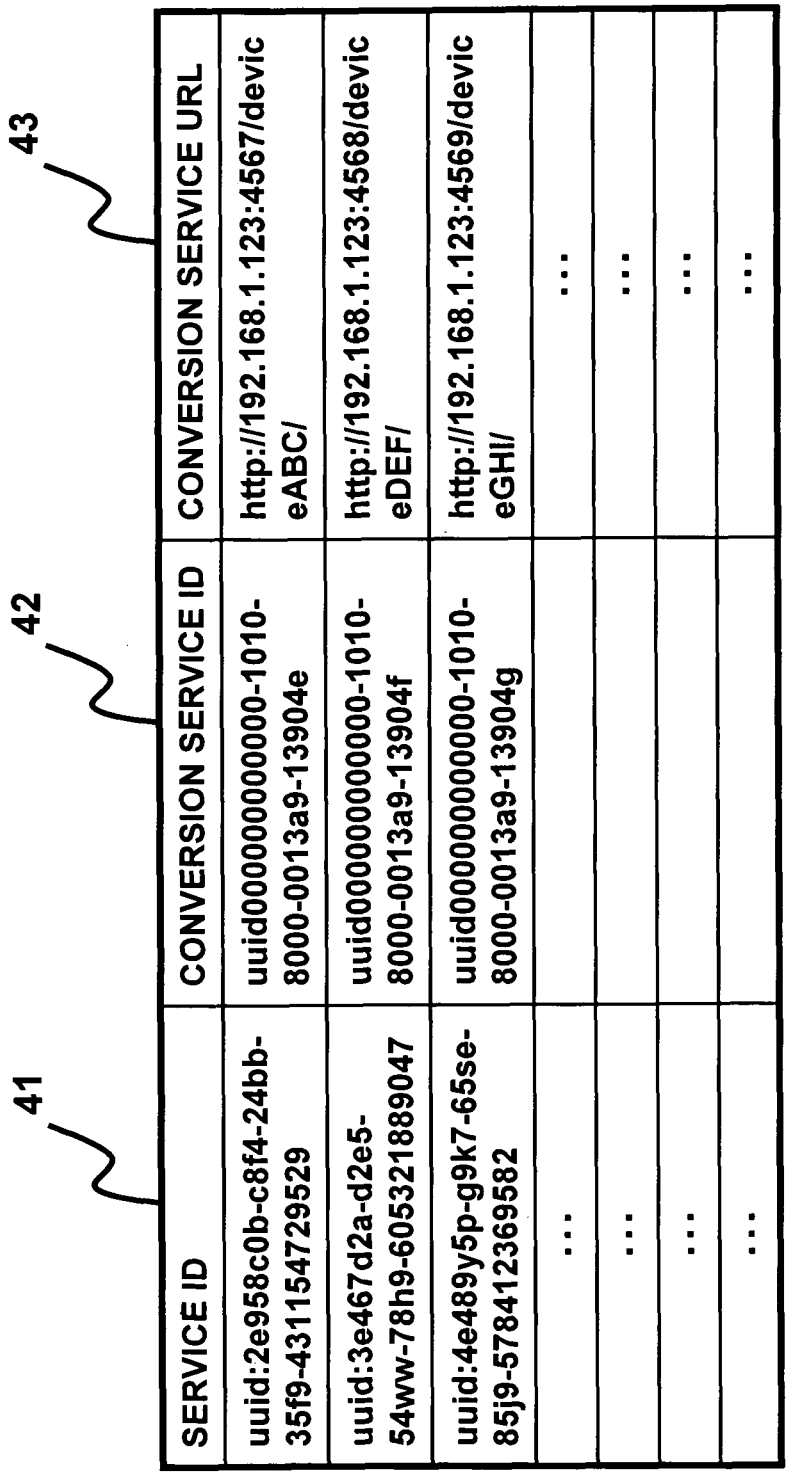
FIG. 4 shows one example of a conversion service information storing section.

The conversion service information storing section 21 is a storage for storing information concerning to conversion services per service. FIG. 4 shows one example of the conversion service information storing section 21. As shown in the figure, the conversion service information storing section 21 specifically stores "service ID" 41, "conversion service ID" 42 and "conversion service URL" 43 while correlating them from each other. It is noted that the "service ID" 41 is ID for uniquely identifying the service providing unit and corresponds to the service ID contained in the service information announced by the service advertising section 12 described above. The "conversion service ID" 42 is ID for uniquely identifying the conversion service for converting the service provided by the service providing unit. The "conversion service URL" 43 is URL for using the conversion service. The service ID, conversion service ID and conversion service URL are registered in the conversion service information storing section 21 in advance for all services that may be possibly provided via the network 40.

An explanation will be made again with reference to FIG. 2. The service discovering section 22 executes processes for detecting the service available on the network 40. Specifically, the service discovering section 22 always monitors the network 40 and detects the service information announced by the service providing unit 10.

The conversion process selecting section 23 executes processes for selecting the conversion service for converting the service detected by the service discovering section 22. Specifically, the conversion process selecting section 23 selects the conversion service ID and conversion service URL, respectively, corresponding to the service ID contained in the service information detected by the service discovering section 22 among the conversion service IDs and conversion service URLs stored in the conversion service information storing section 21.

When the service discovering section 22 detects the service, the service advertising section 24 generates conversion service information for using the conversion service selected by the conversion process selecting section 23. Then, the service advertising section 24 executes processes for announcing the generated conversion service information on the network 40. Specifically, the service advertising section 24 generates and announces the conversion service information containing the service ID and conversion service URL of the conversion service selected by the conversion process selecting section 23, the service ID preset in the service information (called as "original service ID" hereinafter) detected by the service discovering section 22, and others.

FIG. 5 shows one exemplary conversion service information announced by the service advertising section 24 of the gateway unit 20. The service information shown in FIG. 5 is an example generated on the basis of the service information shown in FIG. 3. The conversion service ID is set between a <UDN> tag and a </UDN> tag as indicated by (c) in FIG. 5. The original service ID is set between a <original UDN> tag and a </original UDN> tag as indicated by (d) in FIG. 5. The original service ID refers to (a) shown in FIG. 3. The conversion service URL is set between <presentation URL> and </presentation URL> as indicated by (e) in FIG. 5. The URL for using the service is described directly in the service information in FIG. 5. Therefore, no such reference information to the service that has been set between the <serviceList> tag and the </serviceList> tag as shown in FIG. 3 is set in the service information of FIG. 5.

FIG. 2 will be explained again. The user authenticating section 25 executes processing for authenticating the user who uses the conversion service. Specifically, the user authenticating section 25 receives a request for using the conversion service from the user terminal unit 30. Then, the user authenticating section 25 authenticates the user who has transmitted the request by using a certain authenticating technology. For example, the user authenticating section 25 stores user IDs and passwords of the users admitted to use the conversion service in storage means not shown. Then, the user authenticating section 25 authenticates the user by collating the stored user ID and password with user ID and password inputted by the user in making the request for using the service.

The service converting section 26 executes processes for providing a conversion service corresponding to respective services in response to the request of use from the user. Specifically, the user authenticating section 25 executes processes for authenticating the user at first when it receives the request of use of the conversion service from the user terminal unit 30. Then, the service converting section 26 refers to the conversion service information storing section 21 on the basis of the conversion service URL specified from the user to obtain the service ID corresponding to the conversion service URL. Then, the service converting section 26 transmits the request of use of the service to the service providing unit identified by the obtained service ID. The service converting section 26 also converts data answered from the service providing unit in response to the request of use by using a conversion program correlated with the conversion service URL.

The conversion program is stored in the storage means not shown by being correlated per conversion service URL. The conversion program may be realized by using a publicly known communication protocol conversion technology. For example, the communication protocol conversion technology made open to the public in "Features of DeleGate" in Internet URL:http://www.delegate.org/delegate/features/ (Retrieved on Oct. 30, 2006) allows conversions between the HTTP and FATP, the NNTP and POP and the FTP and LPR.

A case when the service converting section 26 converts communication protocols by using the conversion program will be explained here. The service converting section 26 may convert the format of the data transmitted from the service providing unit 10 to the user terminal unit 30. For instance, the service converting section 26 compresses video data by using a data compressing conversion program in transmitting the video data to the user terminal unit 30 whose processing performance is low. As a result, the user terminal unit 30 can reduce a load that is placed upon the user terminal unit 30 in replaying such video data.

Then, the service converting section 26 transmits the data obtained as a result of conversion performed by using the conversion program to the user terminal unit 30. The service converting section 26 provides the conversion service corresponding to the requested service in the same manner on and after that by converting the data exchanged between the service providing unit 10 and the user terminal unit 30 by using the conversion program.

That is, the service converting section 26 converts the data transmitted from the service providing unit 10 to the user terminal unit 30 into the format that can be processed on the Web browser, i.e., into the format conforming to the HTTP. The service converting section 26 also converts the data transmitted from the user terminal unit 30 to the service providing unit 10 into the format conforming to the communication protocol used in the service providing unit 10c.

The service converting section 26 converts the service provided by the service providing unit 10 into the format that can be processed on the Web browser. As a result, the user can use the service provided by the service providing unit 10 by using the Web browser provided in the user terminal unit 30.

Next, the configuration of the user terminal unit 30 will be explained. The user terminal unit 30 is a terminal unit such as a personal computer or a PDA (Personal Digital Assistance) that is used by the user in using services. The user terminal unit 30 has a presenting section 31, a discovered service storing section 32 and a service discovering section 33.

The presenting section 31 represents the general Web browser conforming to the HTTP. The presenting section 31 presents a service directory showing available services, a control screen for using the services provided by the service providing unit 10, and others.

When the user requests to present the service directory, the presenting section 31 requests the service discovering section 33 to generate the service directory. Then, when the user specifies a service out of the service directory, the presenting section 31 obtains conversion service URL by making reference to the conversion service information corresponding to the specified service. Then, the presenting section 31 makes an access to the gateway unit 20 by specifying the obtained conversion service URL. Thereby, the request for using the conversion service for converting the service specified by the user is transmitted to the gateway unit 20.

The discovered service storing section 32 stores service information and conversion service information detected on the network 40. FIG. 6 shows one example of the discovered service storing section 32. Specifically, the discovered service storing section 32 stores the service information and conversion service information in which "service ID" 61, "original service ID" 62 and "presentation URL" 63 are correlated each other per service ID as shown in FIG. 6.

The service discovering section 33 described later updates the service information and conversion service information. The service ID (see (a) shown in FIG. 3) contained in the service information announced by the service providing unit 10 is set in the Service ID 61 of the service information. Nothing is set in the Original Service ID 62 of the service information. URL indicating the service providing unit 10 contained in the service information announced by the service providing unit 10 is set in the Presentation URL 63 of the service information.

The conversion service ID (see (c) shown in FIG. 5) contained in the conversion service information announced by the gateway unit 20 is set in the Service ID 61 of the conversion service information. The original service ID (see (d) shown in FIG. 5) contained in the conversion service information announced by the gateway unit 20 is also set in the Original Service ID 62 of the conversion service information. The conversion service URL (see (e) shown in FIG. 5) is set in the Presentation URL 63 of the conversion service information.

The service discovering section 33 executes processes for detecting services and conversion services available on the network 40. Specifically, the service discovering section 33 always monitors the network 40 and detects the service information announced by the service providing unit 10 and the conversion service information announced by the gateway unit 20, respectively. The service discovering section 33 also stores the detected information in the discovered service storing section 32.

When the service discovering section 33 detects the service information and conversion service information corresponding to one and same service, it invalidates the service information. The service discovering section 33 also updates the discovered service storing section 32 so that the conversion service information is validated.

Figure 7A:
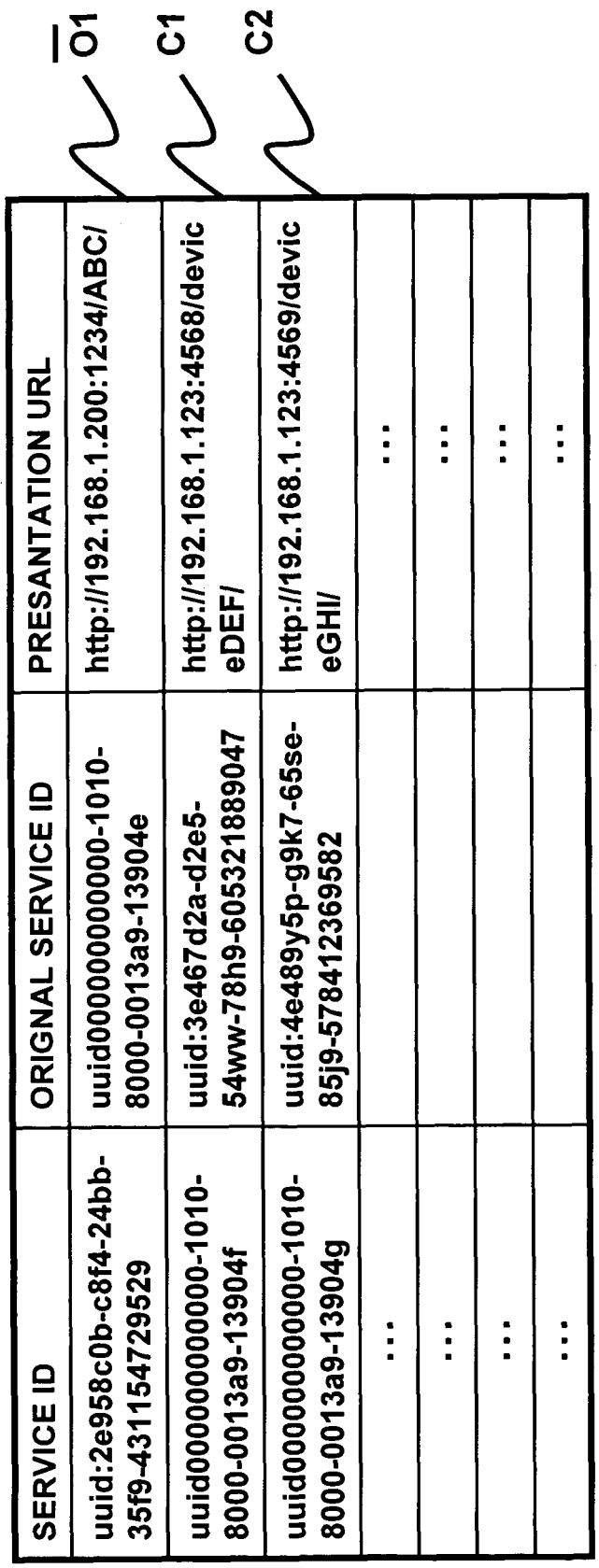
FIGS. 7A, 7B and 7C show one exemplary updating of the discovered service storing section.
Figure 7B:
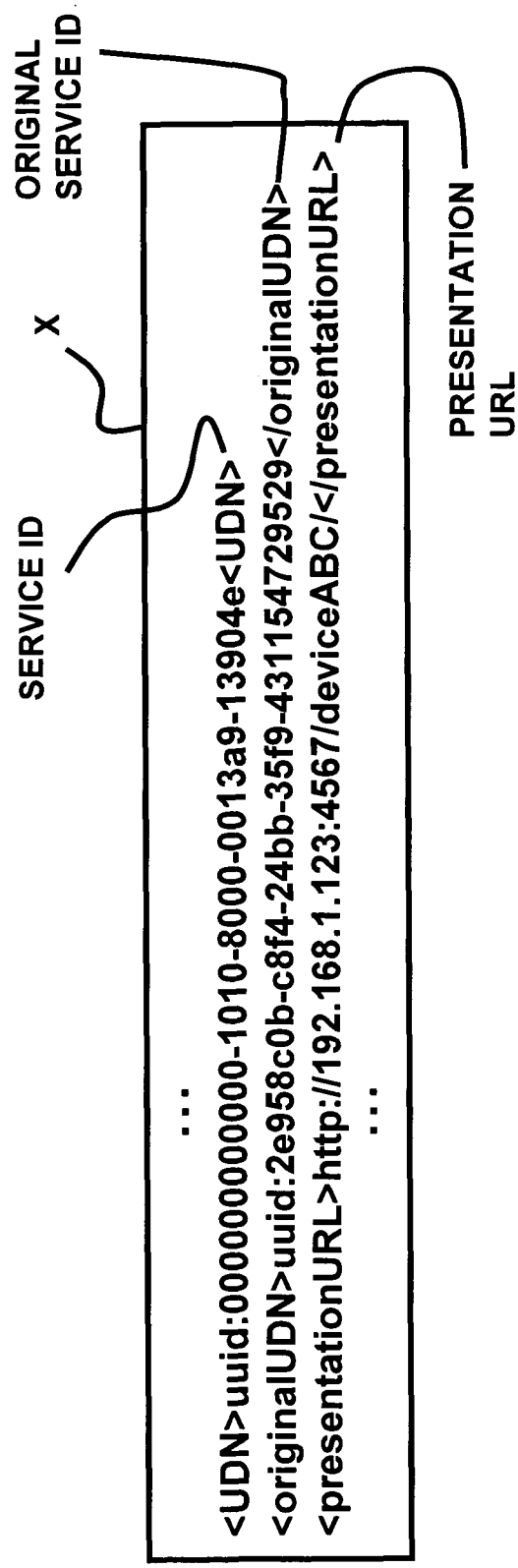
Figure 7C:
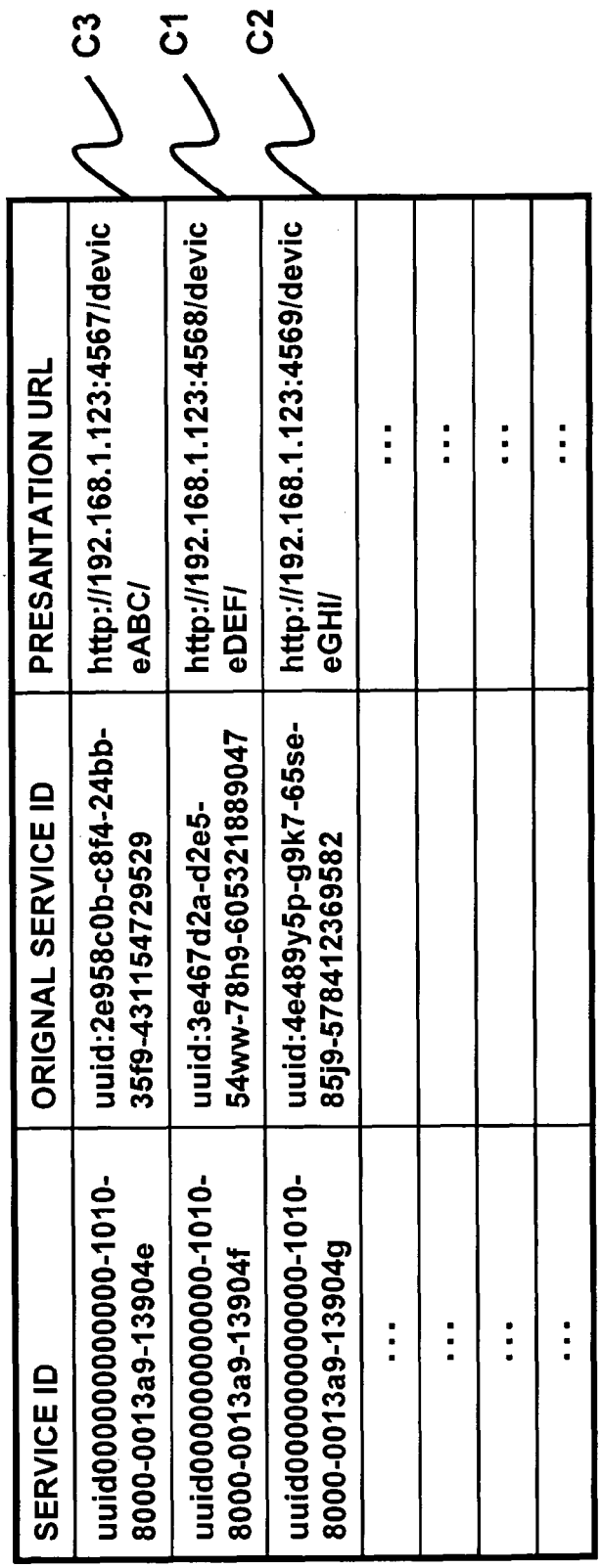

FIGS. 7A, 7B and 7C show one exemplary updating of the discovered service storing section 32. Suppose that service information O1, conversion service information C1 and C2 are stored respectively in the discovered service storing section 32 as shown in FIG. 7A for example.

Then, suppose also that the service discovering section 33 detects conversion service information X shown in FIG. 7B for example. In this case, the original service ID of the detected conversion service information X coincides with the service ID of the service information O1, so that it can be seen that the conversion service information X and the service information O1 correspond respectively to the same service.

Then, the service discovering section 33 deletes the service information O1 stored in the discovered service storing section 32 and registers the detected conversion service information X instead. Specifically, the service discovering section 33 registers the conversion service information C3 to the discovered service storing section 32 after deleting the service information O1. The conversion service information C3 is composed of the conversion service ID, original service ID and presentation URL of the conversion service information X as shown in FIG. 7B.

A process related to storage of such service information and conversion service information is called as a "service merging process" hereinafter. The service merging process will be detailed later.

The service discovering section 33 automatically detects services and conversion services available on the network 40. As a result, it enables the user to eliminate a step of inputting an address (URL) of the service providing unit 10 in using the service by using the Web browser (presenting section 31).

When the presenting section 31 requests to generate a service directory, the service discovering section 33 makes reference to the service information and conversion service information stored in the discovered service storing section 32 and generates the service directory in which types of services are listed from the referred conversion service information. Then, the service discovering section 33 responds to the presenting section 31.

Next, a flow of processes in the service providing system of the present embodiment will be explained.

Figure 8:
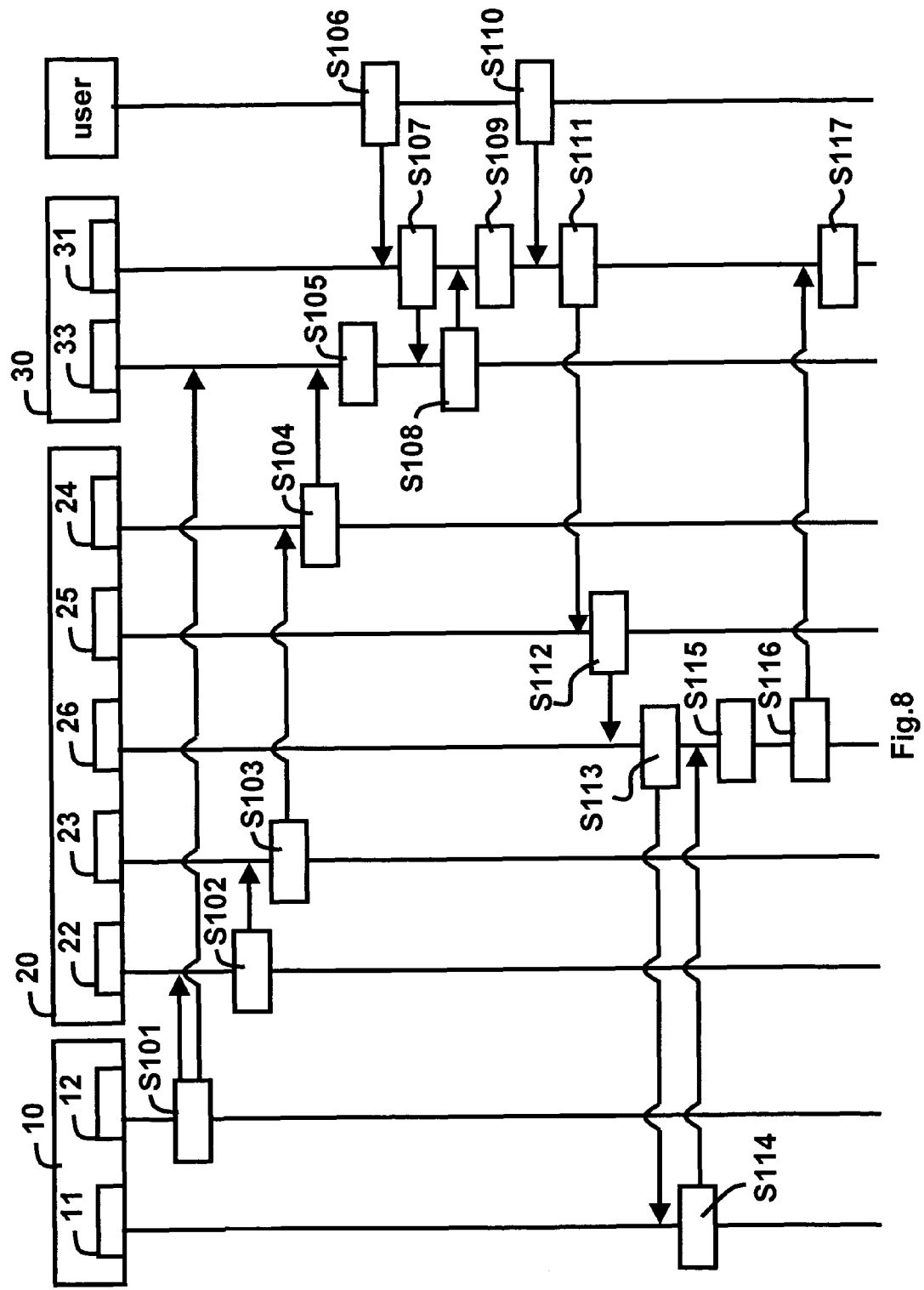
FIG. 8 is a sequential diagram showing a flow of processes in the service providing system of the present embodiment.

FIG. 8 is a sequential diagram showing the flow of processes in the service providing system of the present embodiment. As shown in the figure, the service advertising section 12 of the service providing unit 10 announces the service information on the network during when it is connected to the network (Step S101).

The service discovering section 22 of the gateway unit 20 detects the service information announced by the service providing unit 10 (Step S102). The conversion process selecting section 23 of the gateway unit 20 selects a conversion service on the basis of the detected service information (Step S103). The service advertising section 24 of the gateway unit 20 announces the selected conversion service on the network (Step S104).

The service discovering section 33 of the user terminal unit 30 detects the service information announced by the service providing unit 10 and the conversion service information announced by the gateway unit 20. Then, the service discovering section 33 performs the service merging process and stores the respective service information to the discovered service storing section 32 (Step S105).

Then, when the user requests to present the service directory (Step S106), the presenting section 31 of the user terminal unit 30 requests the service discovering section 33 to generate the service directory (Step S107).

The service discovering section 33 that has been requested to generate the service directory generates the service directory on the basis of the service information stored in the discovered service storing section 32. Then, the service discovering section 33 responds to the presenting section 31 by sending the generated service directory (Step S108).

The presenting section 31 presents the received service directory (Step S109). Then, the user is requested to designate a service by the presented service directory. Suppose here that the user designates the service provided by the service providing unit 10 (Step S110). In this case, the presenting section 31 requests a conversion service corresponding to the designated service to the gateway unit 20 (Step S111).

The gateway unit 20 that has accepted an access accompanying to the request of the conversion service executes the following processes. That is, the user authenticating section 25 of the gateway unit 20 authenticates the user who has requested the access (Step S112). The service converting section 26 of the gateway unit 20 requests the service to the service providing unit 10 (Step S113).

The service providing unit 10 that has been requested to provide the service executes predetermined processes for providing the service. Then, the service providing unit 10 responds to the gateway unit 20 by data related to the service (Step S114).

The gateway unit 20 that has received the response of the data related to the service converts the data into data in the format conforming to the HTTP (Step S115). The gateway unit 20 transmits the data that has undergone the conversion to the user terminal unit 30 (Step S116).

The user terminal unit 30 receives the data converted into the format conforming to the HTTP. Then, the presenting section 31 of the user terminal unit 30 presents the received data (Step S117).

Next, a processing procedure of the service merging process carried out by the service discovering section 33 of the user terminal unit 30 will be explained.

Figure 9:
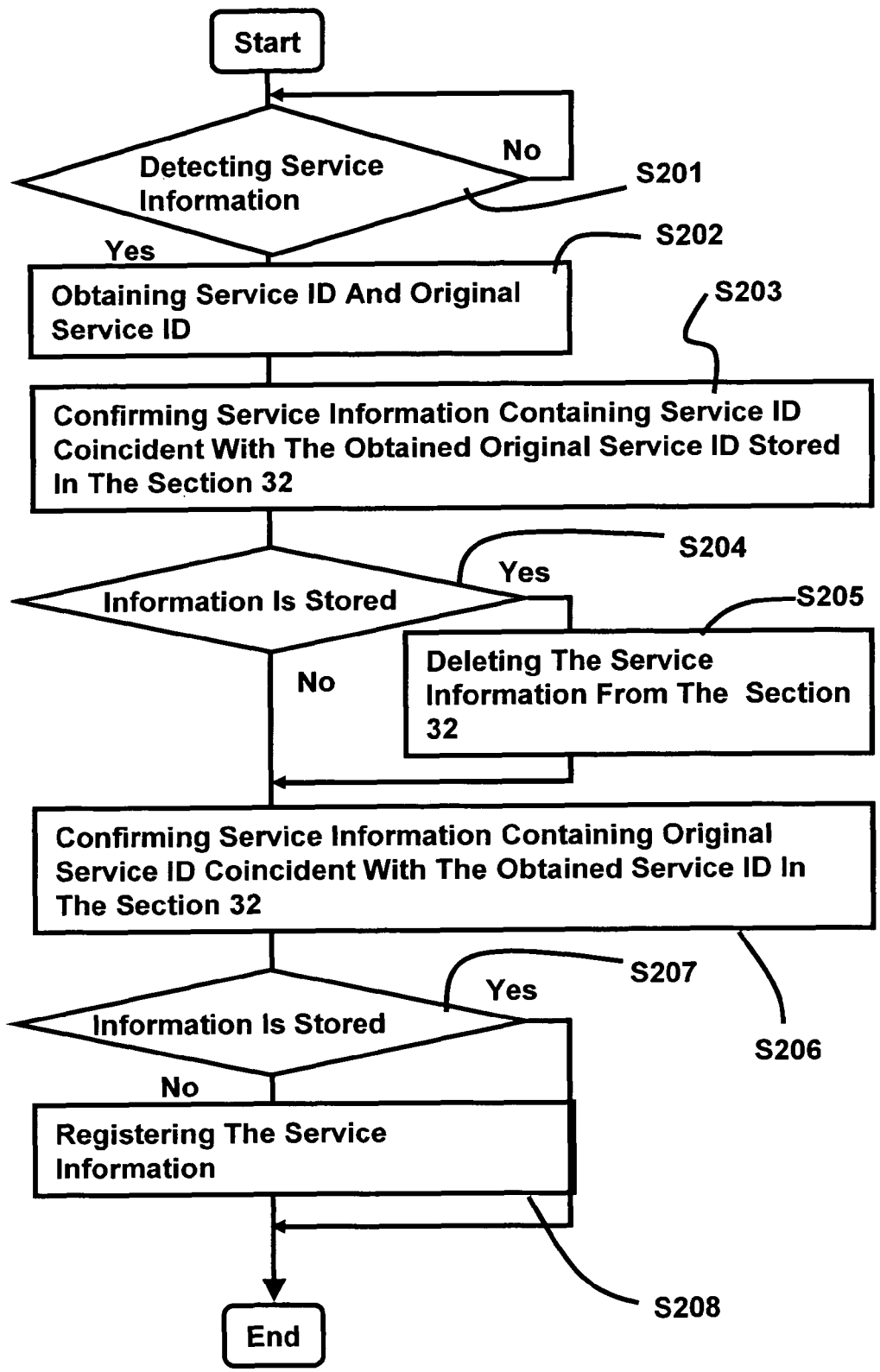
FIG. 9 is a flowchart showing a processing procedure of a service merging process carried out by a service discovering section of a user terminal unit.

FIG. 9 is a flowchart showing the processing procedure of the service merging process carried out by the service discovering section 33 of the user terminal unit 30. It is noted that the service information announced by the service providing unit 10 and the conversion service information announced by the gateway unit 20 are called as service information altogether.

When the service discovering section 33 detects service information or conversion service information on the network (Yes in Step S201), it obtains service ID or conversion service ID and original service ID at first from the detected service information or conversion service information (Step S202).

Then, the service discovering section 33 confirms whether or not service information or conversion service information containing service ID coincident with the obtained original service ID are stored in the discovered service storing section 32 (Step S203).

When the service information or conversion service information is not stored (No in Step S204), the service discovering section 33 confirms whether or not service information containing original service ID coincident with the obtained service ID or conversion service ID is stored in the discovered service storing section 32 (Step S206).

When the service information or conversion service information are stored in contrary (Yes in Step S204), the service discovering section 33 deletes the service information from the discovered service storing section 32 (Step S205). After carrying out the process in Step S205, the service discovering section 33 confirms whether or not service information containing original service ID coincident with the obtained service ID or conversion service is stored in the discovered service storing section 32 (Step S206).

When the service information is stored in the discovered service storing section 32 (Yes in Step S207), the service discovering section 33 ends the service merging process.

When the service information is stored in the discovered service storing section 32 in contrary (No in Step S207), the service discovering section 33 registers the service information or conversion service information detected on the network in the discovered service storing section 32 (Step S208).

As described above, according to the present embodiment, the conversion service information storing section 21 stores information related to the conversion service for converting the data conforming to the communication protocol used in the service providing unit 10 in providing the service by the service providing unit 10 into the data conforming to the HTTP per service. When the service providing unit 10 provides the service, the service converting section 26 provides the conversion service corresponding to the service on the basis of information related to the conversion service stored in the conversion service information storing section 21.

In contrary, it has been necessary for the user to install the dedicated client program to the terminal unit in order to use the service in the past. The client program has functions of discovering service information announced on the network, of controlling accesses to the information device and of presenting the control screen for using the service. Still more, conventionally the communication protocol used in exchanging data between the information device and the client program may differ per each information device. Accordingly, the client program must have been installed per type of service. As a result, there has been a problem that a burden of operational costs required in using the services, such as expenses in introducing and updating the client program and works required in the installation, become heavy in the past.

According to the present embodiment, however, the user of the service providing system can use the service provided by the service providing unit 10 by using the general representation means such as the Web browser provided in the user terminal unit 30. Thereby, the user can use the various services without requiring the dedicated client program prepared for each service for the user terminal unit 30. Thus, it cuts the operational cost that is required in using the service in the service providing system.

Furthermore, according to the present embodiment, the service discovering section 33 of the user terminal unit 30 detects services available for the user terminal unit 30 by receiving the service information for identifying the service that can be provided by the service providing unit 10. When the service detected by the service discovering section 33 is provided, the service converting section 26 of the gateway unit 20 provides the conversion service corresponding to that service. The service provided via the network is automatically detected and the user of the user terminal unit 30 can use the detected service by the user terminal unit 30 in the service providing system.

According to the present embodiment, the service advertising section 24 transmits information related to convertible service on the basis of the information related to the conversion service stored in the conversion service information storing section 21. The user terminal unit 30 detects the convertible service by receiving the information transmitted by the service advertising section 24. The user terminal unit 30 transmits a request for service on the basis of this information. When the service is provided corresponding to the request for service, the service converting section 26 provides the conversion service corresponding to the pertinent service. As a result, the service providing system can communicate the user of the service available via the network. Thus, the user can use the various services via the user terminal unit 30 even when the address of the service providing unit 10 connected to the network is unknown.

Furthermore, according to the present embodiment, when the request for service is transmitted from the user terminal unit 30, the user authenticating section 25 judges whether or not to permit to provide the service to the user who has transmitted the request for service. When the user authenticating section 25 judges to permit the provision of the service, the service converting section 26 provides the conversion service corresponding to the service. As a result, the service providing system can limit the use of the service per each user.

Still more, according to the present embodiment, the service converting section 26 also judges whether or not to permit to provide data related to the service to the user who has been judged and permitted by the user authenticating section 25 such that the service may be provided. Judging that the provision of service and of data related to the service is permitted, the service converting section 26 provides the conversion service corresponding to the service. As a result, the service providing system can limit the use of data provided by the service per each user.

While the embodiment of the present invention has been explained above, the invention may be carried out in various different modifications other than the embodiment described above.

For example, basically no unit of user is defined in the standards of UPnP and DLNA. Therefore, the UPnP and DLNA are provided with no function of authentication of user, of access control per user, of customization or the like. In contrary, they are often provided with an access limiting function per unit of device.

Then, the service providing unit 10 is restricted so that it can communicate only with the gateway unit 20 at first. Thereby, the user terminal unit 30 is disabled to communicate directly with the service providing unit 10 and communicates always via the gateway unit, 20. Then, the user authenticating section 25 of the gateway unit 20 authenticates the user and the service converting section 26 of the gateway unit 20 makes an access control to an available service per each authenticated user.

Figure 10:
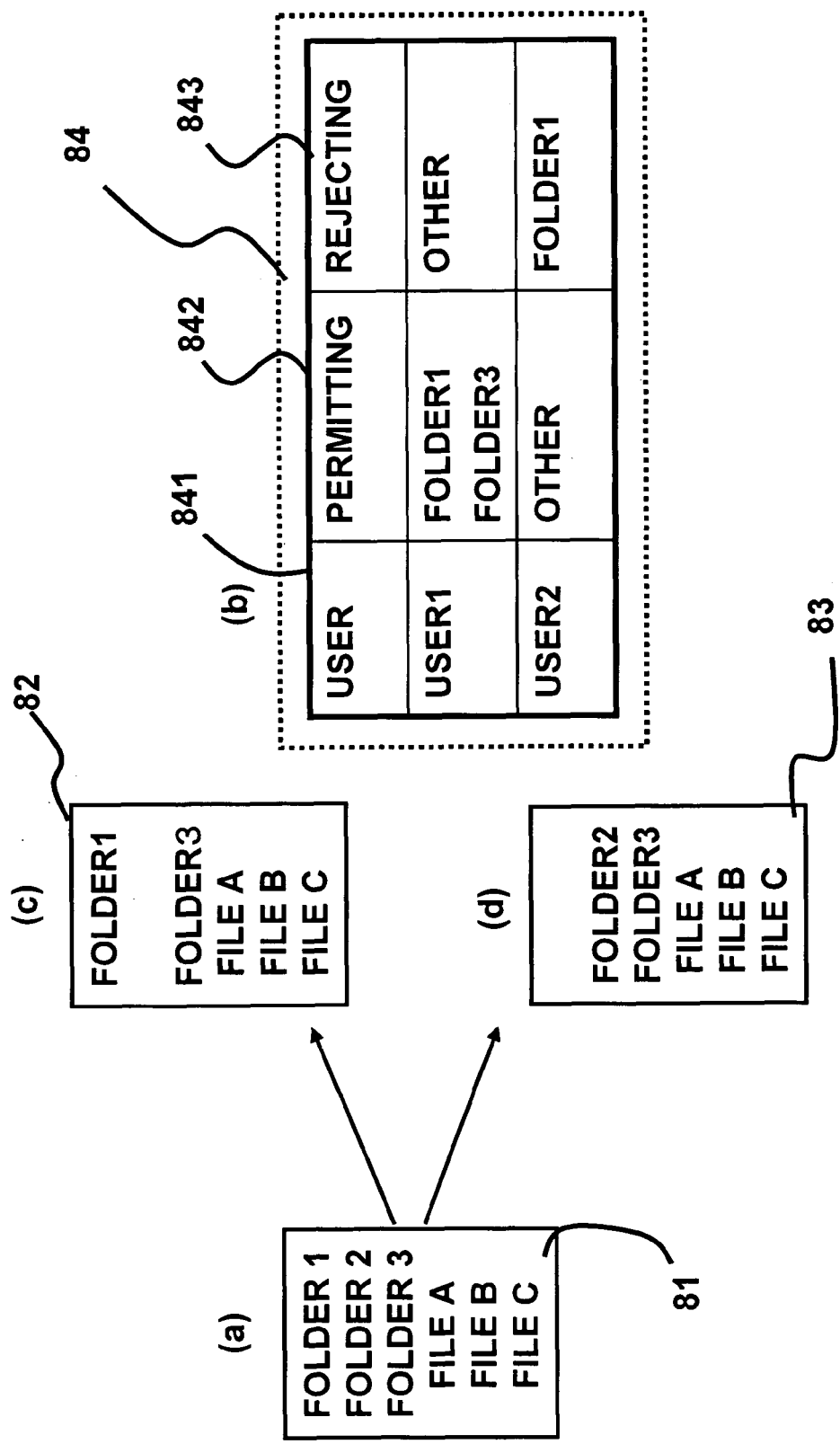
FIG. 10 is tables for explaining access control per user made by a service converting section of the gateway unit.

When the service providing unit 10 is a file server for storing various files for example, the following configuration may be adopted. An explanation will be made on a case when the service converting section 26 of the gateway unit 20 limits accesses to a file stored in the service providing unit 10 per user. FIG. 10 is tables for explaining the access control per user made by the service converting section 26 of the gateway unit 20.

In this case, the gateway unit 20 stores an access control list 84 defining whether or not an access to the file can be made per user in advance. Then, the service converting section 26 controls the access to the various files on the basis of the access control list 84. Specifically, data 842 permitting the access and data 843 rejecting the access are preset per user 841 in the access control list 84.

The reference numeral 81 in FIG. 10 (*a*) denotes the whole data of service providing means before conversion. Suppose for example that three holders of "Folder 1", "Folder 2" and "Folder 3" are stored in the service providing unit 10 (file server). Suppose further that three files of "File A", "File B" and "File C" are stored on a lower order of the "Folder 3".

Here, suppose that the access control list is set as follows (b). The reference numeral 82 denotes an accessible range of the User1 and the reference numeral 83 denotes an accessible range of the User2. According to the setting of the "User1", while its access to the "Folder 1" and "Folder 2" is permitted, the access to the other folders and files is rejected. According to the setting of the "User2", while its access to the "Folder 1" is rejected, the access to the other folders and files is permitted.

The service converting section 26 controls the access of the User1 so as to permit only the following accesses (c). That is, the accessible folders of the User1 are the "Folder 1" and "Folder 3" and the "File A", "File B" and "File C" on the lower order of the "Folder 3".

The service converting section 26 also controls the access of the User2 so as to permit only the following accesses (d). That is, the accessible folders of the User2 are the "Folder 2" and "Folder 3" and the "File A", "File B" and "File C" on the lower order of the "Folder 3".

The gateway unit 20 has converted the service by using the conversion program stored per conversion service in advance in the embodiment described above. However, the service converting section 26 may also convert the service by using a conversion program providing service provided by another service providing unit connected via the network. It is noted that the service providing unit providing the conversion program providing service will be called as a "conversion program providing unit" hereinafter.

Figure 11:
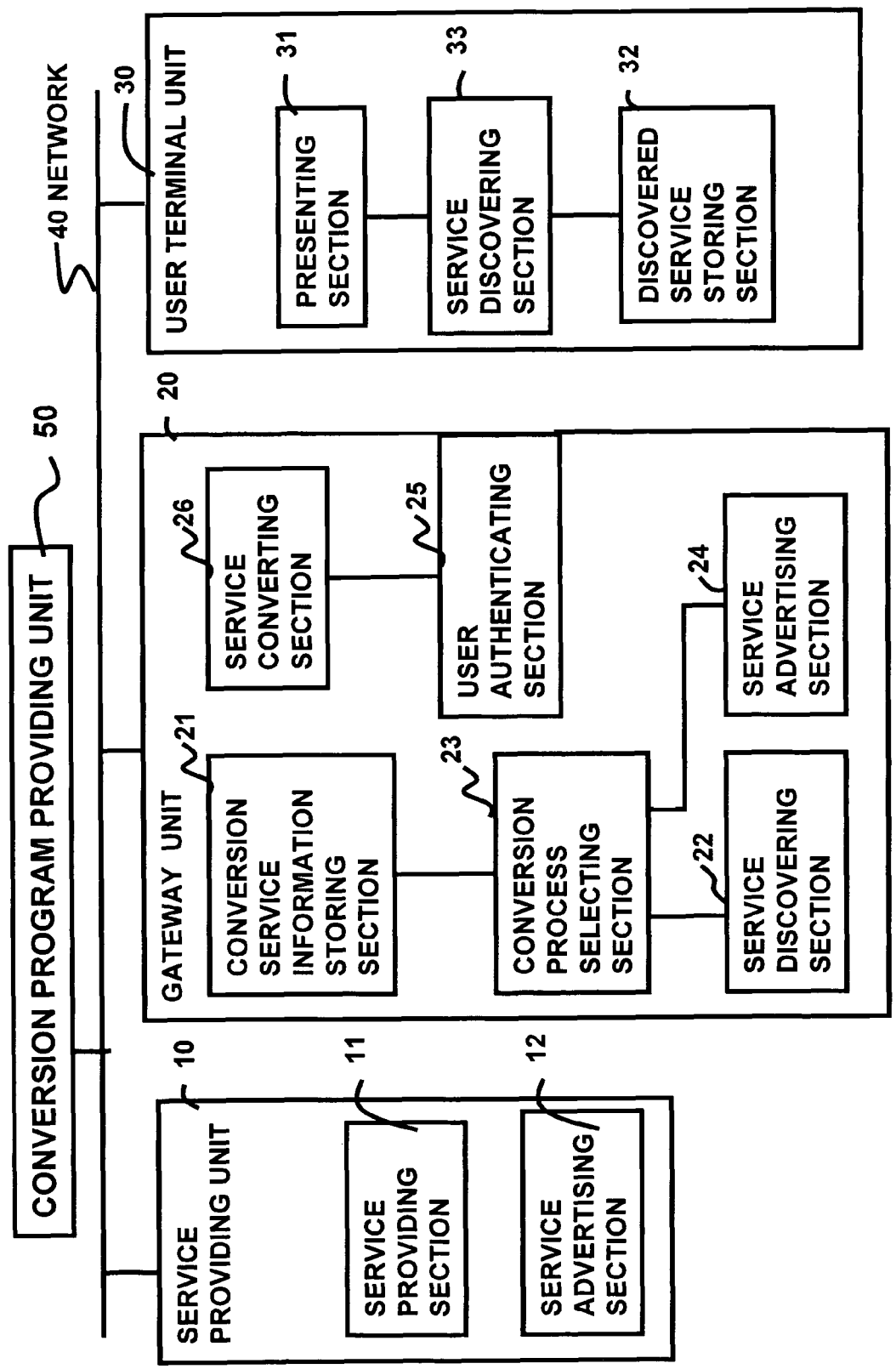
FIG. 11 is a functional block diagram showing a configuration of the service providing system in utilizing a conversion program providing service.

FIG. 11 is a functional block diagram showing a configuration of the service providing system in utilizing the conversion program providing service. In this case, the service providing system may be constructed by connecting the conversion program providing unit further via the network 40 as shown in FIG. 11.

At first, the service converting section 26 receives a request for using a conversion service from the user terminal unit 30. Then, the service converting section 26 downloads the conversion program for realizing the requested conversion service from the conversion program providing unit 50. The service converting section 26 provides the conversion service by executing the downloaded conversion program.

The service converting section 26 may also download the conversion program on the basis of the user authenticated by the user authenticating section 25. When the service providing unit 10 is a contents server for providing contents such as video images and music for example, the service converting section 26 may download the conversion program capable of converting the service so as to meet a taste of the user out of a plurality of conversion programs on the basis of past download and the like per each user.

Further, while the service converting section 26 has provided the conversion service here by executing the conversion program downloaded from the conversion program providing unit 50, the service converting section 26 may provide the conversion service by requesting the conversion program providing unit 50 to convert the service and by obtaining its result.

Still more, while only one conversion program providing unit 50 is shown in FIG. 11, the conversion program providing unit 50 may be provided per type or group of the conversion program.

While the gateway unit 20 has been explained above, the configuration of the gateway unit 20 may be also realized by software. The software may be a communication control program that operates a computer as the gateway unit 20. The computer executing the communication control program will be explained.

Figure 12:
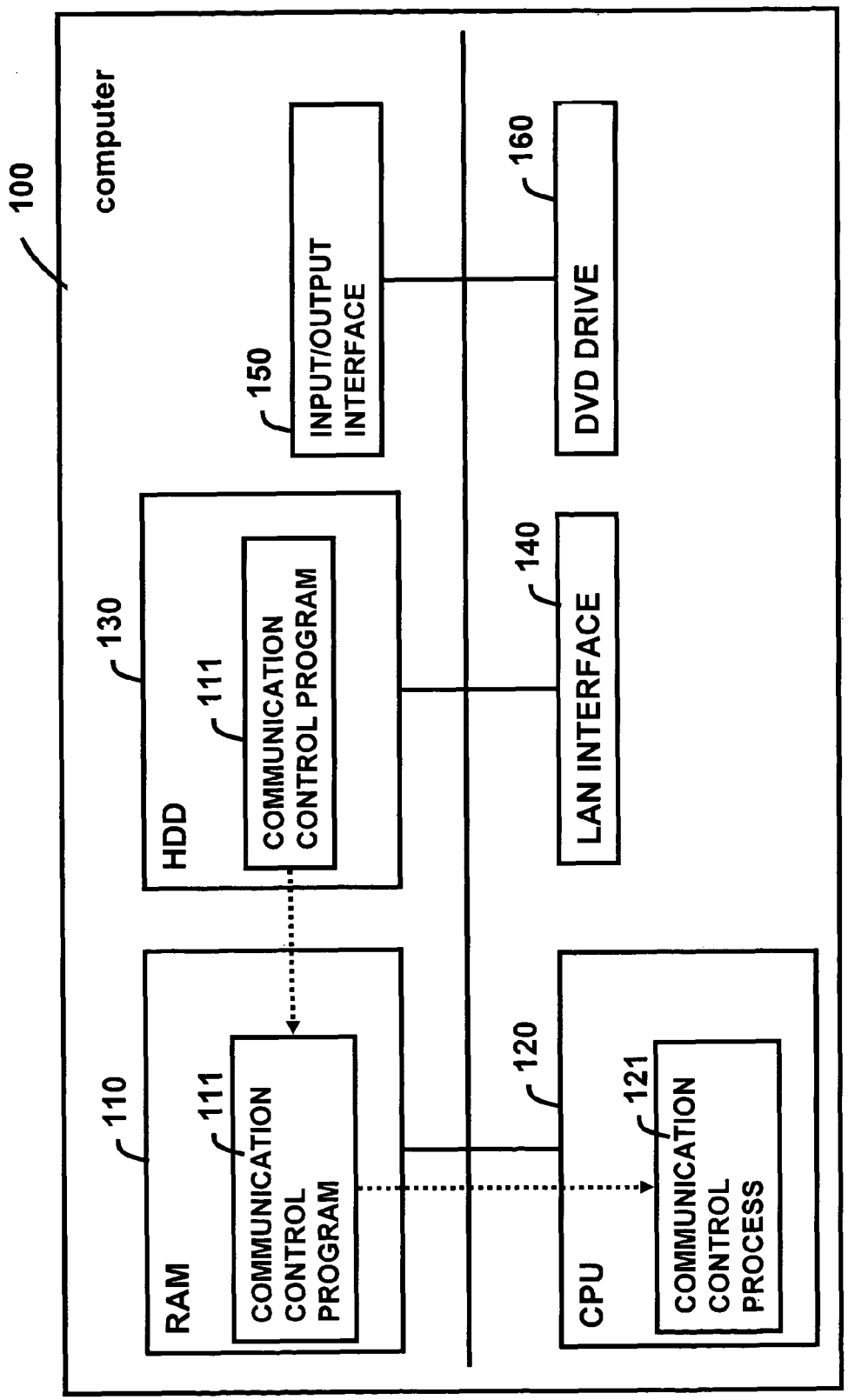
FIG. 12 is a functional block diagram showing a configuration of a computer executing a communication control program of the present embodiment.

FIG. 12 is a functional block diagram showing a configuration of the computer executing the communication control program of the present embodiment. As shown in the figure, the computer 100 has a RAM (Random Access Memory) 110, a CPU (Central Processing Unit) 120, a HDD (Hard Disk Drive) 130, a LAN (Local Area Network) interface 140, an input/output interface 150 and a DVD (Digital Versatile Disk) drive 160.

The RAM 110 stores the program, results during execution of the program and others. The CPU 120 executes the program read out of the RAM 110. The HDD 130 is a disk unit for storing the program and data. The LAN interface 140 is an interface for connecting the computer 100 to other computers via LAN. The input/output interface 150 is an interface for connecting input devices such as a mouse and a keyboard and a display unit. The DVD drive 160 is a device for reading or writing data from/to a DVD.

A communication control program 111 executed in the computer 100 is stored in the DVD for example. The DVD drive 160 reads the communication control program 111 out of the DVD. The read communication control program 111 is installed into the computer 100.

Or, the communication control program 111 is stored in a database or the like of another computer system connected via the LAN interface 140 and is read out of the database to be installed into the computer 100.

Then, the installed communication control program is stored in the HDD 130. The CPU 120 operates the communication control program 111 as a communication control process 121 by reading it to the RAM 110.

Among the respective processes explained in the present embodiment, the whole or part of the processes explained as being automatically performed may be manually performed. Or, the whole or part of the processes explained as being manually performed may be automatically performed by known methods.

Furthermore, the processing procedures, control procedures, specific names and information containing various data and parameters shown in the embodiments and the drawings may be arbitrarily changed except of cases specifically noted.

The respective components of the respective units shown in the drawings are functional and conceptual and are not necessarily physically configured as shown in the drawings. That is, specific modes of distribution and integration of the respective units are not limited to those in the drawings and the whole or part of the respective units may be configured by functionally or physically distributing or integrating in an arbitrary unit corresponding to various loads and use conditions.

For example, the service providing unit 10 or the user terminal unit 30 may have the function related to the data conversion of the gateway unit 20 explained in the embodiment.

Furthermore, the whole or arbitrary part of the respective processing functions performed by the respective devices may be realized by the CPU and a program analyzed and executed by the CPU or may be realized by wired logic hardware.

As described above, the communication control program, communication control method, communication control unit and service providing system of the invention are useful for the service providing system that provides various services via the network. Especially, they are suitable in providing the various services to the user without using a dedicated client program provided per each service.

What is claimed is:
1. A communication system, comprising:
a plurality of service providing devices providing a service;
a service using device using the service; and
a gateway apparatus controlling a communication data communicated between the plurality of service providing devices and the service using device via a network, the gateway apparatus including:

a memory configured to store service identification information for identifying one of the plurality of service providing devices, conversion service identification for identifying conversion service for bilaterally converting the communication data into formats that can be processed by the one of the plurality of service providing devices and the service using device based on a type of the service, and conversion service Uniform Resource Locator (URL) indicating URL for using the conversion service, the conversion service identification and the conversion service URL being correlated to each other, and a processor executing a process including:
receiving the service identification information announced by the plurality of service providing devices,
selecting the conversion service URL stored in the memory on the basis of the received service identification information,
announcing the conversion service information including the selected conversion service URL,
receiving a first request for using the conversion service sent from the service using device by using the conversion service URL,
obtaining the service identification information stored in the memory based on the basis of the conversion service URL corresponding to the first request,
sending a second request for using the service to the service providing device identified by the obtained service identification information,
receiving a response data corresponding to the second request from the service providing device identified by the obtained service identification information,
detecting the conversion service URL corresponding to the first request from the memory,
converting the response data by using a conversion program correlated with the detected conversion service URL, and
sending the converted response data to the service using device, wherein the service using device detects the service information announced by the plurality of service providing devices and the conversion service information announced by the gateway apparatus, respectively, wherein the service using device stores the detected service information, and wherein the service using device updates that the conversion service information is validated when the service using device detects the service information and the conversion service information corresponding to one and same service.

2. The communication system according to claim 1, wherein the plurality of service providing devices generate service information for using the service including the service identification information, and wherein the plurality of service providing devices send the generated service information on the network.

3. The communication system according to claim 1, wherein the gateway apparatus stores account information for indicating whether a user has account information for using the system, and wherein the gateway apparatus transmits the service when the user corresponding to the first request was authenticated.

4. The communication system according to claim 1, wherein the gateway apparatus stores account information for indicating whether a user is using the service, and wherein the gateway apparatus transmits the service when the user corresponding to the first request was authenticated.

5. A communication control method for controlling a system having a plurality of service providing devices providing a service, a service using device using the service, and a gateway apparatus, the method comprising:
controlling a communication data communicated between the plurality of service providing devices and the service using device via a network;
storing service identification information for identifying one of the plurality of service providing devices, conversion service identification for identifying conversion service for bilaterally converting the communication data into formats that can be processed by the one of the plurality of service providing devices and the service using device based on a type of the service, and conversion service Uniform Resource Locator (URL) indicating URL for using the conversion service, the conversion service identification and the conversion service URL being correlated to each other;
receiving the service identification information announced by the plurality of service providing devices;
selecting the conversion service URL stored in the memory on the basis of the received service identification information,
announcing the conversion service information including the selected conversion service URL,
receiving a first request for using the conversion service sent from the service using device by using the conversion service URL,
obtaining the service identification information stored in the memory based on the basis of the conversion service URL corresponding to the first request,
sending a second request for using the service to the service providing device identified by the obtained service identification information,
receiving a response data corresponding to the second request from the service providing device identified by the obtained service identification information,
detecting the conversion service URL corresponding to the first request from the memory,
converting the response data by using a conversion program correlated with the detected conversion service URL; and
sending the converted response data to the service using device,
wherein the service using device detects the service information announced by the plurality of service providing devices and the conversion service information announced by the gateway apparatus, respectively, wherein the service using device stores the detected service information, and wherein the service using device updates that the conversion service information is validated when the service using device detects the service information and the conversion service information corresponding to one and same service.

6. The communication control method according to claim 5, wherein
the plurality of service providing devices generate service information for using the service including the service identification information, and wherein the plurality of service providing devices send the generated service information on the network.

7. The communication control method according to claim 5, further comprising:

storing account information indicating whether a user has account information for using the system in said gateway apparatus, and transmitting the service when the user corresponding to the first request was authenticated.

8. The communication control method according to claim 5, further comprising:

storing account information for indicating whether a user is using the service in said gateway apparatus, and transmitting the service when the user corresponding to the first request was authenticated.

9. A communication control apparatus for connecting a plurality of service providing devices providing a service, the communication control apparatus comprising:

a memory configured to store service identification information for identifying one of the plurality of service providing devices, conversion service identification for identifying conversion service for bilaterally converting the communication data into formats that can be processed by the one of the plurality of service providing devices and a service using device that uses the service based on a type of the service, and conversion service Uniform Resource Locator (URL) indicating URL for using the conversion service, the conversion service identification and the conversion service URL being correlated to each other;

a receiver configured to receive the service identification information announced by the plurality of service providing devices, a first request for using the conversion service sent from the service using device by using the conversion service URL, and a response data corresponding to a second request, the second request for using the service to the service providing device identified by service identification information obtained from the memory, from the service providing device identified by the obtained service identification information, and to detect the conversion service URL corresponding to the first request from the memory;

a converter configured to convert the response data by using a conversion program correlated with the detected conversion service URL; and a transmitter configured to transmit the converted response data to the service using device, wherein the service using device detects the service information announced by the plurality of service providing devices and the conversion service information announced by the gateway apparatus, respectively, wherein the service using device stores the detected service information, and wherein the service using device updates that the conversion service information is validated when the service using device detects the service information and the conversion service information corresponding to one and same service.

* * * * *